(12) United States Patent
Sugiyama (10) Patent No.: US 12,327,877 B2
(45) Date of Patent: Jun. 10, 2025

(54) BATTERY MODULE

(71) Applicant: TOYOTA JIDOSHA KABUSHIKI KAISHA, Toyota (JP)

(72) Inventor: Yuta Sugiyama, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 529 days.

(21) Appl. No.: 17/824,275

(22) Filed: May 25, 2022

(65) Prior Publication Data
US 2022/0393297 A1 Dec. 8, 2022

(30) Foreign Application Priority Data

Jun. 7, 2021 (JP) ................................. 2021-095093

(51) Int. Cl.
| | |
|---|---|
| *H01M 50/293* | (2021.01) |
| *H01M 10/651* | (2014.01) |
| *H01M 10/6555* | (2014.01) |
| *H01M 50/48* | (2021.01) |
| *H01M 50/489* | (2021.01) |
| *H01M 10/647* | (2014.01) |
| *H01M 10/653* | (2014.01) |
| *H01M 10/6557* | (2014.01) |
| *H01M 10/658* | (2014.01) |

(52) U.S. Cl.
CPC ....... *H01M 50/293* (2021.01); *H01M 10/651* (2015.04); *H01M 10/6555* (2015.04); *H01M 50/48* (2021.01); *H01M 50/489* (2021.01); *H01M 10/647* (2015.04); *H01M 10/653* (2015.04); *H01M 10/6557* (2015.04); *H01M 10/658* (2015.04); *Y02E 60/10* (2013.01)

(58) Field of Classification Search
CPC ............. H01M 10/647; H01M 10/651; H01M 10/653; H01M 10/6555; H01M 10/6557; H01M 10/658; H01M 50/293; H01M 50/48; H01M 50/489; Y02E 60/10
See application file for complete search history.

(56) References Cited

U.S. PATENT DOCUMENTS

| | | |
|---|---|---|
| 2011/0070476 A1 | 3/2011 | Takahashi et al. |
| 2017/0358788 A1 | 12/2017 | Inoue et al. |

(Continued)

FOREIGN PATENT DOCUMENTS

| | | |
|---|---|---|
| JP | 2010-165597 A | 7/2010 |
| JP | 2011-076779 A | 4/2011 |
| JP | 2015-079655 A | 4/2015 |

(Continued)

*Primary Examiner* — Lingwen R Zeng
(74) *Attorney, Agent, or Firm* — Dinsmore & Shohl LLP (57) ABSTRACT

A battery module capable of restraining heat conductivity among battery cells in rising temperature includes: a plurality of a battery cells arranged along a thickness direction; an elastic member between neighboring battery cells of the plurality of battery cells; and a thermally expandable resin composition body arranged in the elastic member; wherein: in a plan view along with the thickness direction, the resin composition body is arranged to include a center of the battery cells; a temperature at which the resin composition body starts to expand is 80° C. or more; and heat conductivity after expansion of the resin composition body is 0.5 W/m·K or less.

6 Claims, 4 Drawing Sheets

(56) References Cited

U.S. PATENT DOCUMENTS

2020/0203784 A1\* 6/2020 Shimizu ............ H01M 10/6555
2021/0288362 A1\* 9/2021 Churchill .......... H01M 10/0525

FOREIGN PATENT DOCUMENTS

| JP | 2016-152072 A | 8/2016 |
| JP | 2017-182898 A | 10/2017 |
| JP | 2018-137065 A | 8/2018 |
| JP | 2019-172762 A | 10/2019 |
| JP | 2019-175718 A | 10/2019 |
| WO | 2019-151037 A1 | 8/2019 |

\* cited by examiner

BATTERY MODULE

CROSS-REFERENCE TO RELATED APPLICATIONS

This application is based upon and claims the benefit of priority of the prior Japanese Patent Application No. 2021-095093 filed Jun. 7, 2021, the entire contents of which are incorporated herein by reference.

TECHNICAL FIELD

The present disclosure relates to a battery module.

BACKGROUND ART

A battery module comprising a plurality of a battery cell including, in the order along with the thickness direction, a cathode current collector, a cathode active material layer, an electrolyte layer, an anode active material layer, and an anode current collector, has been known. For example, Patent Literature 1 discloses a battery module comprising a first heat conductive member and a first thermally expandable member arranged between battery cells neighboring. Patent Literature 2 discloses a battery module in which an elastic member is arranged between battery cells neighboring. Patent Literature 3 discloses an assembly battery structure in which a heat insulation member is arranged between battery cells. Patent Literature 4 discloses a battery in which a thermally expandable fireproof member is arranged between battery modules neighboring. Patent Literature 5 discloses battery pack in which a separator including a convex part is arranged between battery cells neighboring.

CITATION LIST

Patent Literatures

Patent Literature 1: International Application Publication: WO 2019/151037
Patent Literature 2: Japanese Patent Application Laid-Open (JP-A) No. 2016-152072
Patent Literature 3: JP-A No. 2015-079655
Patent Literature 4: JP-A No. 2017-182898
Patent Literature 5: JP-A No. 2011-076779

SUMMARY OF DISCLOSURE

Technical Problem

In a battery module with a plurality of battery cells layered, there is a risk that, when one battery cell generates heat, battery cells neighboring may also generate heat. The present disclosure has been made in view of the above circumstances, and a main object thereof is to provide a battery module capable of restraining heat conductivity among battery cells in rising temperature.

Solution to Problem

In order to achieve the object, the present disclosure provides a battery module including a plurality of a battery cell arranged along with a thickness direction, the battery module including: an elastic member between the battery cell neighboring; a thermally expandable resin composition body is arranged in the elastic member; in a plan view along with the thickness direction, the resin composition body is arranged to include a center of the battery cell; a temperature at which the resin composition body starts to expand is 80° C. or more; and heat conductivity after expansion of the resin composition body is 0.5 W/m·K or less.

According to the present disclosure, the elastic member including the specified resin composition body is arranged between the battery cell neighboring, and thus a battery module capable of restraining heat conductivity among battery cells in rising temperature may be obtained.

In the disclosure, the resin composition body may be arranged in a groove of the elastic member.

In the disclosure, the resin composition body may be arranged in a penetrated part of the elastic member.

In the disclosure, when $T_1$ designates a thickness of the elastic member and $T_2$ designates a thickness of the resin composition body, a rate of the $T_2$ with respect to the $T_1$, which is $T_2/T_1$ may be, 35% or more.

In the disclosure, in a plan view along with the thickness direction, the elastic member may be in a square shape, and when a direction parallel to a longer side is regarded as a first direction, a direction orthogonal to the first direction is regarded as a second direction, $X_1$ designates a length of the elastic member in the first direction, $X_2$ designates a length of the resin composition body in the first direction, $Y_1$ designates a length of the elastic member in the second direction, and $Y_2$ designates a length of the resin composition body in the second direction, each of a rate of the $X_2$ with respect to the $X_1$, which is $X_2/X_1$, and a rate of the $Y_2$ with respect to the $Y_1$, which is $Y_2/Y_1$, may be 25% or more.

In the disclosure, each of the $X_2/X_1$ and the $Y_2/Y_1$ may be 30% or more.

In the disclosure, each of the $X_2/X_1$ and the $Y_2/Y_1$ may be 50% or less.

In the disclosure, in a plan view along with the thickness direction, when $S_1$ designates an area of a region specified from an outer edge of the elastic member, and $S_2$ designates an area of a region specified from an outer edge of the resin composition body, a rate of the $S_2$ with respect to the $S_1$, which is $S_2/S_1$ may be, 6.25% or more and 25% or less.

In the disclosure, the elastic member may include a concave and convex pattern on a surface.

In the disclosure, the concave and convex pattern may be in a comb tooth pattern, a stripe pattern or a dot pattern.

Effects of Disclosure

The present disclosure exhibits an effect of restraining heat conductivity among battery cells in rising temperature.

DESCRIPTION OF EMBODIMENTS

The battery module in the present disclosure will be hereinafter described in details with reference to drawings. Each drawing described as below is a schematic view, and the size and the shape of each portion are appropriately exaggerated in order to be understood easily.

Figure 1:
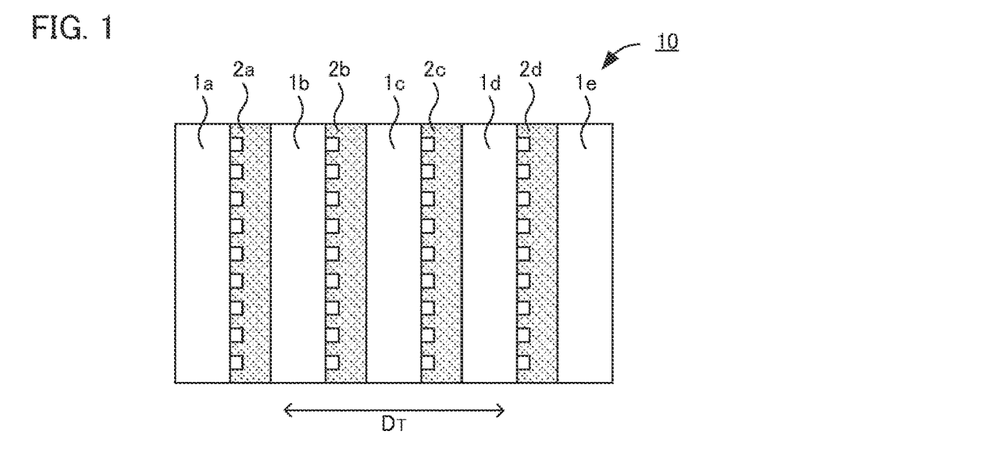
FIG. 1 is a schematic side view exemplifying the battery module in the present disclosure.

FIG. 1 is a schematic side view exemplifying the battery module in the present disclosure. Battery module 10 shown in FIG. 1 includes a plurality of battery cell 1 (battery cells 1$a$ to 1$e$) arranged along with thickness direction $D_T$. Also, the battery module 10 includes elastic member 2 between the battery cell 1 neighboring. In FIG. 1, elastic member 2$a$ is arranged between battery cell 1$a$ and battery cell 1$b$, elastic member 2$b$ is arranged between battery cell 1$b$ and battery cell 1$c$, elastic member 2$c$ is arranged between battery cell 1$c$ and battery cell 1$d$, and elastic member 2$d$ is arranged between battery cell 1$d$ and battery cell 1$e$.

Figure 2A:
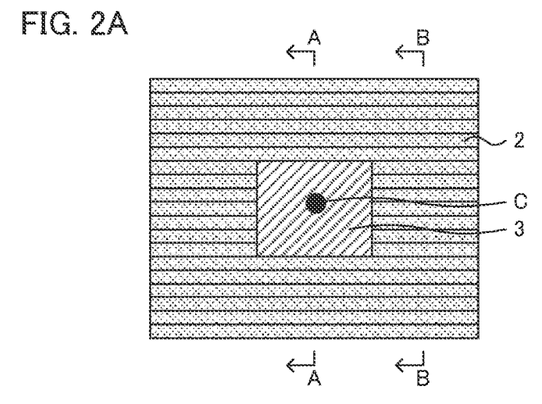
FIG. 2A is a schematic plan view exemplifying the elastic member and the resin composition body in the present disclosure.
Figure 2B:
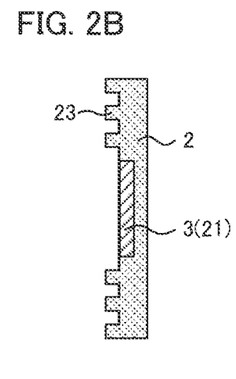
FIG. 2B is a schematic cross-sectional view taken along the lines A-A of FIG. 2A exemplifying the elastic member and the resin composition body in the present disclosure.
Figure 2C:
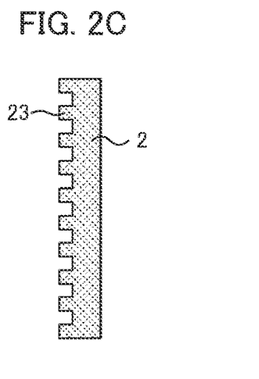
FIG. 2C is a schematic cross-sectional view taken along the lines B-B of FIG. 2A exemplifying the elastic member in the present disclosure.

FIG. 2A is a schematic plan view (schematic plan view when viewed along with the thickness direction) exemplifying the elastic member in FIG. 1, FIG. 2B is a cross-sectional view of A-A in FIG. 2A, and FIG. 2C is a cross-sectional view of B-B in FIG. 2A. As shown in FIG. 2B, thermally expandable resin composition body 3 is arranged in groove 21 of elastic member 2, and as shown in FIG. 2A, resin composition body 3 is arranged to include center C of a battery cell (not illustrated). Also, the resin composition body 3 shown in FIG. 2B is not completely enclosed in the elastic member 2, but is at least partially exposed from the elastic member 2.

Figure 3:
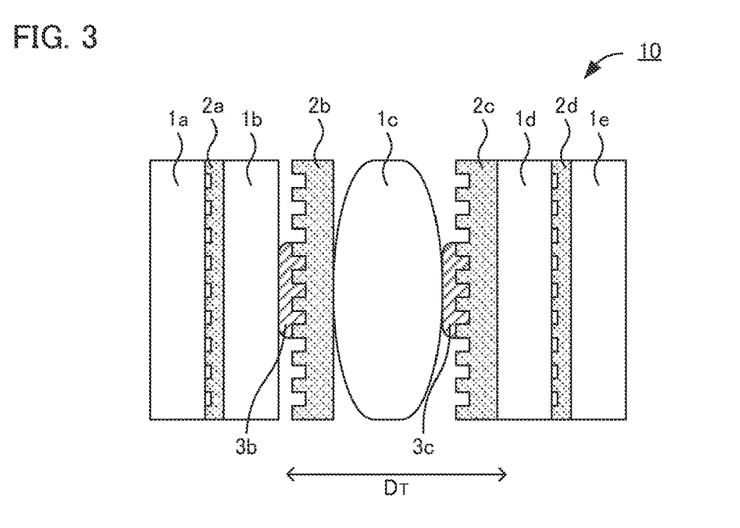
FIG. 3 is a schematic side view exemplifying the battery module in the present disclosure.

According to the present disclosure, the elastic member including the specified resin composition body is arranged between the battery cell neighboring, and thus a battery module capable of restraining heat conductivity among battery cells in rising temperature may be obtained. The effects of the present disclosure will be hereinafter explained in more details with reference to FIG. 3. FIG. 3 shows a battery module when the battery cell 1$c$ in FIG. 1 generates heat and expands.

As shown in FIG. 3, when the battery cell 1$c$ generates heat and expands, the heat of the battery cell 1$c$ conducts to resin composition bodies 3$b$ and 3$c$ arranged in elastic members 2$b$ and 2$c$, and the resin composition bodies 3$b$ and 3$c$ expand. As a result, in the thickness direction $D_T$, expanded battery cell 1$c$ may take distance from battery cells 1$b$ and 1$d$ neighboring the battery cell 1$c$. In particular, the resin composition bodies 3$b$ and 3$c$ are, in a plan view along with the thickness direction $D_T$, arranged to include the center C (the point expands the most) of the battery cell 1$c$, and thus the distance from the expanded battery cell 1$c$ to the battery cells 1$b$ and 1$d$ neighboring thereof may be effectively increased.

Further, heat conductivity of the resin composition bodies 3$b$ and 3$c$ after the expansion is low, and thus the heat of the battery cell 1$c$ is prevented from conducting to the battery cells 1$b$ and 1$d$ via the resin composition bodies 3$b$ and 3$c$. Also, when the resin composition body 3$c$ expands due to heat, as shown in FIG. 3, a space (air layer) is formed as a heat insulating layer between the battery cell $1c$ and the elastic member $2c$, and the heat of the battery cell $1c$ is prevented from conducting to the battery cell $1d$. Similarly, when the resin composition body $3b$ expands due to heat, as shown in FIG. 3, a space (air layer) is formed as a heat insulating layer between the elastic member $2b$ and the battery cell $1b$, and the heat of the battery cell $1c$ and the elastic member $2b$ is prevented from conducting to the battery cell $1b$. Also, as shown in FIG. 3, when the battery cell $1c$ expands, the elastic members $2a$ and $2d$ (elastic members arranged in the opposite side of the expanded battery cell $1c$, in the battery cells $1b$ and $1d$ neighboring) contract, and thereby the expansion of the battery module overall may be inhibited, and the deformation of the battery cells $1b$ and $1d$ neighboring may be inhibited.

1. Elastic Member and Resin Composition Body

The battery module in the present disclosure includes an elastic member between the battery cell neighboring. In some embodiments, the battery module includes a plurality of the elastic member. In some embodiments, when the battery module includes three or more of the battery cell, there are plurality of intervals between battery cells neighboring, and the elastic member may be arranged in all of the intervals. Also, a thermally expandable resin composition body is arranged in the elastic member in the present disclosure.

The temperature at which the resin composition body starts to expand is usually 80° C. or more, may be 90° C. or more, and may be 100° C. or more. When the temperature at which the resin composition body starts to expand is too low, unintended expansion of the resin composition body easily occurs. Meanwhile, the upper limit of the temperature at which the resin composition body starts to expand is not particularly limited, but if it is too high, there is a possibility that the heat conductivity among the battery cells in rising temperature may not be sufficiently restrained. The temperature at which the resin composition body starts to expand is not particularly limited, but for example, it is 170° C. or less. The temperature at which the resin composition body starts to expand refers to the temperature at which the volume of the resin composition body at 25° C. expands to 1.5 times. The temperature at which the resin composition body starts to expand may be adjusted by changing the kind and the composition of the material in the resin composition body (such as a resin and an expandable material).

Also, the heat conductivity of the resin composition body after its expansion is usually 0.5 W/m·K or less, and may be 0.3 W/m·K or less. Meanwhile, the lower limit of the heat conductivity is not particularly limited, but when the heat conductivity is too low, the range of selections for the resin composition body that can be used would be narrow. The heat conductivity of the resin composition body after its expansion may be obtained from a disk heat flow meter method in accordance with ASTM E1530. The heat conductivity after the expansion may be adjusted by changing the kind and the composition of the materials in the resin composition body (such as a resin and an expandable material). Also, the heat conductivity of the resin composition body before its expansion with respect to the heat conductivity after its expansion may be higher, may be equal, and may be lower, but it is often higher.

The volume expansion rate of the resin composition body is, for example, 2 times or more, may be 5 times or more, and may be 10 times or more. If the volume expansion rate is too small, there is a possibility that the heat conductivity among the battery cells in rising temperature may not be sufficiently restrained. Meanwhile, the upper limit of the volume expansion rate of the resin composition body is not particularly limited, but if the volume expansion rate is too large, the range of selections for the resin composition body that can be used would be narrow.

The resin composition body in the present disclosure contains, for example, a resin and an expandable material. Examples of the resin may include a thermoplastic resin, a thermosetting resin, and an elastomer resin. Examples of the thermoplastic resin may include polyethylene, polypropylene, polystyrene, polyvinyl chloride, and thermoplastic polyurethane. Examples of the thermosetting resin may include a phenol resin, an epoxy resin, thermosetting polyurethane, a urea resin, and a melamine resin. Examples of the elastomer resin may include a silicone rubber, a fluorine rubber, and an acrylonitrile butadiene rubber. The resin composition body may contain just one kind of the resin, and may contain two kinds or more of the resin.

The expandable material is a material that expands due to heat. Examples of the expandable material may include a layered inorganic substance such as vermiculite, kaolin, mica, and thermally expandable graphite. The content of the expandable material is not particularly limited, but with respect to 100 parts by weight of the resin, for example, the content of the expandable material is 1 part by weight or more and 50 parts by weight or less.

Meanwhile, the elastic material in the present disclosure is not limited if it is a member with elasticity, and examples thereof may include rubber and urethane. The elastic member may be a member that is not thermally expandable. "A member that is not thermally expandable" refers to a member of which volume increase rate when heated from a room temperature to a melting point is less than 1.5 times. Incidentally, for example, when the elastic member has porosity and heated from a room temperature to a melting point, the volume may be decreased. Also, the heat conductivity of the elastic member with respect to the heat conductivity of the resin composition body after its expansion may be higher, may be equal, and may be lower.

Next, the structure of the elastic member and the structure of the resin composition body will be described with reference to FIGS. 2A to 2C, and FIGS. 4A to 7C. As shown in FIG. 2A, resin composition body 3 is arranged to include center C of the battery cell (not illustrated). The resin composition body is arranged to include the center (the point expands the most) of the battery cell, and thus, as shown in FIG. 3 described above, the distance from the expanded battery cell $1c$ to the battery cells $1b$ and $1d$ neighboring thereof may be effectively increased. In the present disclosure, the center of the battery cell refers to a center of gravity in the surface of the battery cell to which the resin composition body opposes.

Figure 4A:
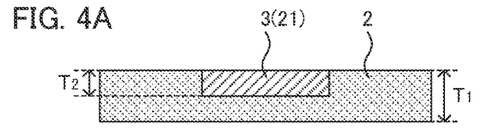
FIG. 4A is a schematic cross-sectional view exemplifying the elastic member and the resin composition body in the present disclosure in which the resin composition body may be arranged in groove in the elastic member.

As shown in FIG. 4A, the resin composition body 3 may be arranged in groove 21 in the elastic member 2. In this case, even when the resin composition body 3 expands, counterforce of the expansion is applied to a battery cell neighboring (battery cell arranged in down side of FIG. 4A) via the elastic member 2 overall including a bottom surface region of the groove 21; thus, the deformation of the battery cell neighboring may be inhibited.

Here, as show in FIG. 4A, $T_1$ designates a thickness of the elastic member 2, and $T_2$ designates a thickness of the resin composition body 3. The rate of $T_2$ with respect to $T_1$, which is $T_2/T_1$ is, for example, 35% or more, may be 40% or more, and may be 45% or more. If $T_2/T_1$ is too small, there is a possibility that the heat conductivity among the battery cells in rising temperature may not be sufficiently restrained. Meanwhile, as shown in FIG. 4A, when the elastic member 2 includes the groove 21, $T_2/T_1$ may be less than 1. In this case, $T_2/T_1$ is, for example, 90% or less, may be 80% or less, and may be 70% or less. If $T_2/T_1$ is too large, there is a possibility that the deformation of the battery cell neighboring may occur.

Figure 4B:
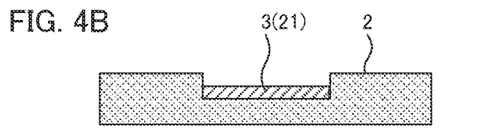
FIG. 4B is a schematic cross-sectional view exemplifying the elastic member and the resin composition body in the present disclosure in which the top surface of the resin composition body is lower than the top surface of the elastic member.
Figure 4C:
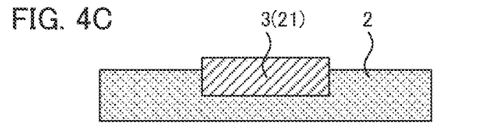
FIG. 4C is a schematic cross-sectional view exemplifying the elastic member and the resin composition body in the present disclosure in which the top surface of the resin composition body 3 is higher than the top surface of the elastic member.

Also, in FIG. 4A, the top surface of the elastic member 2 and the top surface of the resin composition body 3 are in the same surface level, but the top surface of the resin composition body 3 may be in the position (in the inner side position) lower than the top surface of the elastic member 2, as shown in FIG. 4B. In this case, there would be a space on the top surface of the resin composition body 3, and heat dissipation during usage would be high. Meanwhile, as shown in FIG. 4C, the top surface of the resin composition body 3 may be in the position (in the outer side position) higher than the top surface of the elastic member 2. In this case, the resin composition body 3 is arranged in compressed status between battery cells neighboring, and thus the distance from the expanded battery cell to the battery cells neighboring thereof may be effectively increased. Incidentally, in the case of FIG. 4C, $T_2/T_1$ may be less than 1, may be 1, and may be more than 1.

Figure 4D:
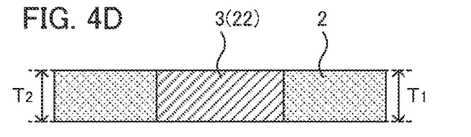
FIG. 4D is a schematic cross-sectional view exemplifying the elastic member and the resin composition body in the present disclosure in which the resin composition body is arranged in a penetrated part of the elastic member.
Figure 4E:
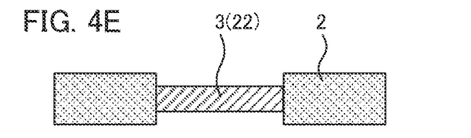
FIG. 4E is a schematic cross-sectional view exemplifying the elastic member and the resin composition body in the present disclosure in which the top surface of the resin composition body lower than the top surface of the elastic member, and the bottom surface of the resin composition body is higher than the bottom surface of the elastic member.
Figure 4F:
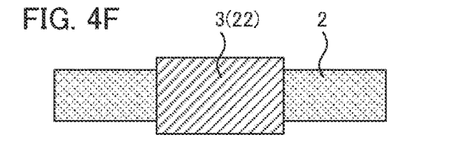
FIG. 4F is a schematic cross-sectional view exemplifying the elastic member and the resin composition body in the present disclosure in which the top surface of the resin composition body is higher than the top surface of the elastic member, and the bottom surface of the resin composition body is lower than the bottom surface of the elastic member.

Meanwhile, as shown in FIG. 4D, the resin composition body 3 may be arranged in penetrated part 22 of the elastic member 2. In this case, when the resin composition body 3 expands, the distance from the expanded battery cell to the battery cell neighboring thereof may be effectively increased. Also, in FIG. 4D, $T_2/T_1$ is 1, however, as shown in FIG. 4E, $T_2/T_1$ may be less than 1, and as shown in FIG. 4F, $T_2/T_1$ may be more than 1. Also, in FIG. 4D, the top surface of the elastic member 2 and the top surface of the resin composition body 3 are in the same surface level, and the bottom surface of the elastic member 2 and the bottom surface of the resin composition body 3 are in the same surface level. In FIG. 4E, the top surface of the resin composition body 3 is in the position (inner side position) lower than the top surface of the elastic member 2, and the bottom surface of the resin composition body 3 is in the position (inner side position) higher than the bottom surface of the elastic member 2. In FIG. 4F, the top surface of the resin composition body 3 is in the position (outer side position) higher than the top surface of the elastic member 2, and the bottom surface of the resin composition body 3 is in the position (outer side position) lower than the bottom surface of the elastic member 2.

Figure 5:
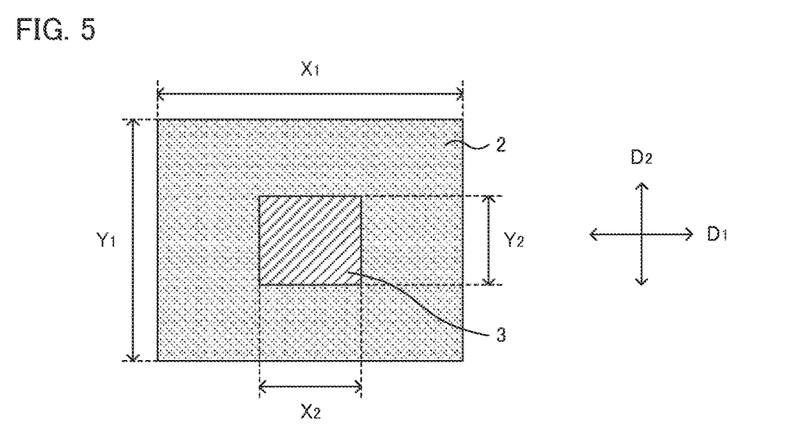
FIG. 5 is a schematic plan view exemplifying the elastic member and the resin composition body in the present disclosure.

As shown in FIG. 5, when the shape of the elastic member 2 in a plan view (shape in a plan view along with the thickness direction) is rectangular, first direction $D_1$ designates a direction parallel to the longer side, and second direction $D_2$ designates a direction orthogonal to the first direction $D_1$. Incidentally, when the shape of the elastic member in a plan view is foursquare, one set of the sides is regarded as a longer side. In FIG. 5, the sides of left and right correspond to the first direction $D_1$, and the sides of up and down correspond to the second direction $D_2$. Also, as shown in FIG. 5, $X_1$ designates a length of the elastic member 2 in the first direction $D_1$, and $X_2$ designates a length of the resin composition body 3 in the first direction $D_1$, $Y_1$ designates a length of the resin composition body 3 in the second direction $D_2$, and $Y_2$ designates a length of the resin composition body 3 in the second direction $D_2$. Each of $X_2/X_1$ and $Y_2/Y_1$ is, for example, 25% or more, and may be 30% or more. If $X_2/X_1$ and $Y_2/Y_1$ are too small, the stress during the expansion of the resin composition body 3 concentrates, and there is a possibility that the deformation of the battery cell neighboring may occur. Meanwhile, each of $X_2/X_1$ and $Y_2/Y_1$ is, for example, 75% or less, and may be 50% or less.

If $X_2/X_1$ and $Y_2/Y_1$ are too large, after the expansion of the resin composition body 3, there is a possibility that the area of the space (air layer) that works as an insulating layer may be relatively small.

The shape of the elastic member in a plan view is, for example, square, in some embodiments, rectangular or foursquare. The shape of the resin composition body in a plan view is, for example, square such as rectangular and foursquare, and circle such as perfect circle and oval. When the shape of the resin composition body in a plan view is circle, each of the length $Y_1$ and $Y_2$ of the resin composition body refers to the maximum lengths in the first direction and in the second direction.

Also, when the elastic member and the resin composition body are observed in a plan view along with the thickness direction, $S_1$ designates the area in the region specified from the outer edge of the elastic member, and $S_2$ designates the area in the region specified from the outer edge of the resin composition body. The rate of $S_2$ with respect to $S_1$, which is $S_2/S_1$ is, for example, 6.25% or more, and may be 11.1% or more. Meanwhile, $S_2/S_1$ is, for example, 56.25% or less and may be 25% or less.

Figure 6A:
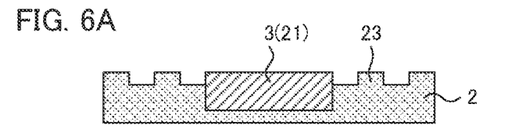
FIG. 6A is a schematic cross-sectional view exemplifying the elastic member and the resin composition body in the present disclosure in which a top surface of the resin composition body and the top surface of the concave and convex pattern are in the same surface level.
Figure 6B:
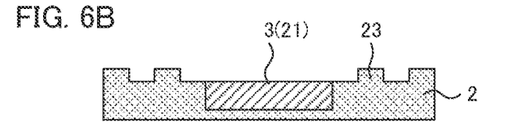
FIG. 6B is a schematic cross-sectional view exemplifying the elastic member and the resin composition body in the present disclosure in which the top surface of the resin composition body and a bottom surface of the concave and convex pattern are in the same surface level.
Figure 6C:
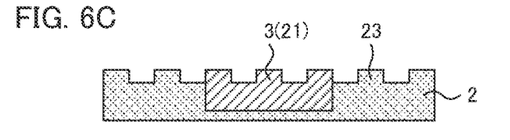
FIG. 6C is a schematic cross-sectional view exemplifying the elastic member and the resin composition body in the present disclosure in which the concave and convex pattern are formed on one surface of the resin composition body.

As shown in FIGS. 6A to 6D, the elastic member 2 may include concave and convex pattern 23 on its surface. Arrangement of the concave and convex pattern 23 allows the heat dissipation to improve. In FIGS. 6A to 6C, the concave and convex pattern 23 is formed on just one surface of the elastic member 2. In FIG. 6A, the top surface of the resin composition body 3 and the top surface of the concave and convex pattern 23 are in the same surface level. In FIG. 6B, the top surface of the resin composition body 3 and the bottom surface of the concave and convex pattern 23 are in the same surface level. Also, although not illustrated, the top surface of the resin composition body may be positioned in the middle level between the top surface and the bottom surface of the concave and convex pattern. Also, as shown in FIG. 6C, the concave and convex pattern may be formed on the surface (one surface) of the resin composition body 3.

Figure 6D:
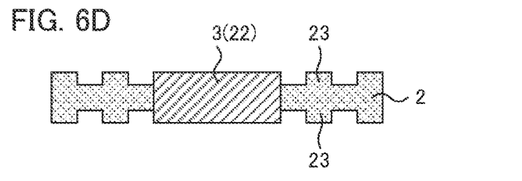
FIG. 6D is a schematic cross-sectional view exemplifying the elastic member and the resin composition body in the present disclosure in which the top surface of the resin composition body and the top surface of the elastic member are in the same surface level, and the bottom surface of the resin composition body and the bottom surface of the elastic member are in the same surface level.
Figure 6E:
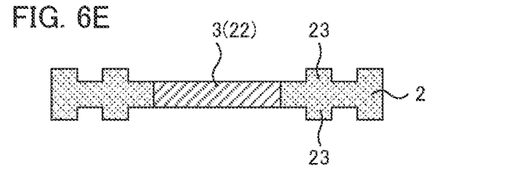
FIG. 6E is a schematic cross-sectional view exemplifying the elastic member and the resin composition body in the present disclosure.
Figure 6F:
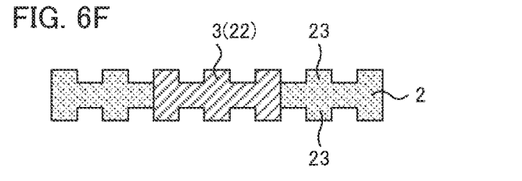
FIG. 6F is a schematic cross-sectional view exemplifying the elastic member and the resin composition body in the present disclosure in which the concave and convex pattern may be formed on both surfaces of the resin composition body.

In FIGS. 6D to 6F, the concave and convex pattern 23 is formed on the both surfaces of the elastic member 2. In FIG. 6D, the top surface of the resin composition body 3 and the top surface of the elastic member 2 are in the same surface level, and the bottom surface of the resin composition body 3 and the bottom surface of the elastic member 2 are in the same surface level. In FIG. 6E, the top surface of the resin composition body 3 is in the position (inner side position) lower than the top surface of the elastic member 2, and the bottom surface of the resin composition body 3 is in the position (inner side position) higher than the bottom surface of the elastic member 2. Also, as shown in FIG. 6F, the concave and convex pattern may be formed on the surface (both surfaces) of the resin composition body 3.

Figure 7A:
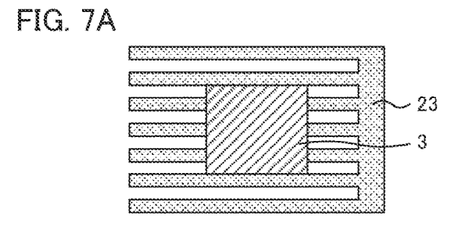
FIG. 7A is a schematic plan view exemplifying the elastic member and the resin composition body in the present disclosure in which the shape of the concave and convex pattern in a plan view is a comb tooth pattern.
Figure 7B:
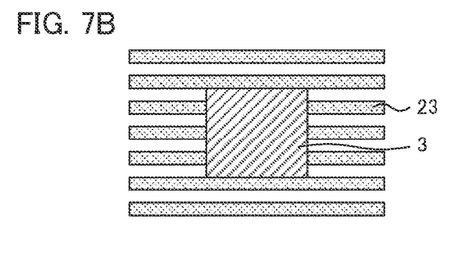
FIG. 7B is a schematic plan view exemplifying the elastic member and the resin composition body in the present disclosure in which the shape of the concave and convex pattern in a plan view is in a stripe pattern.
Figure 7C:
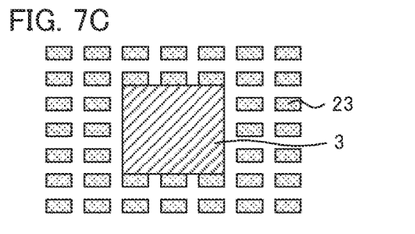
FIG. 7C is a schematic plan view exemplifying the elastic member and the resin composition body in the present disclosure in which the shape of the concave and convex pattern in a plan view is in a dot pattern.

The shape of the concave and convex pattern 23 in a plan view is not particularly limited, and it may be in comb tooth pattern as shown in FIG. 7A, may be in a stripe pattern as shown in FIG. 7B, or may be in a dot pattern as shown in FIG. 7C.

2. Battery Cell

Figure 8:
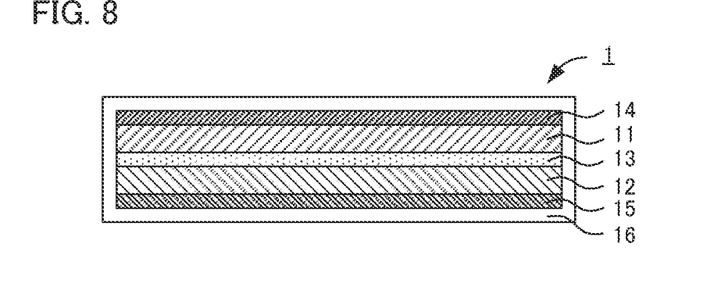
FIG. 8 is a schematic cross-sectional view exemplifying the battery cell in the present disclosure.

FIG. 8 is a schematic cross-sectional view exemplifying the battery cell in the present disclosure. Battery cell 1 illustrated in FIG. 8 includes cathode active material layer 11, anode active material layer 12, electrolyte layer 13 formed between cathode active material layer 11 and anode active material layer 12, cathode current collector 14 for collecting currents of cathode active material layer 11, anode current collector 15 for collecting currents of anode active material layer 12, and battery case 16 for storing these members. The battery cell is typically a lithium ion secondary battery.

(1) Cathode Active Material Layer

The cathode active material layer contains at least a cathode active material, and may contain at least one of a conductive material, a binder and an electrolyte, as required. Examples of the cathode active material may include an oxide active material such as $LiCoO_2$ and $LiNi_{1/3}Co_{1/3}Mn_{1/3}O_2$.

Examples of the conductive material may include a carbon material such as acetylene black, Ketjen black, VGCF, and graphite. Examples of the binder may include a fluorine-based binder such as polyvinylidene fluoride (PVDF) and polytetra fluoroethylene (PTFE), and a rubber-based binder such as acrylate butadiene rubber (ABR) and styrene butadiene rubber (SBR). The electrolyte will be described in "(3) Electrolyte layer".

(2) Anode Active Material Layer

The anode active material layer contains at least an anode active material, and may contain at least one of a conductive material, a binder and an electrolyte, as required. Examples of the anode active material may include a carbon active material such as methocarbon microbeads (MCMB) and highly oriented pyrolytic graphite (HOPG), a metal oxide active material such as $Li_4Ti_5O_{12}$ and a metal active material such as In, Al, Si and Sn. The conductive material, the binder and the electrolyte are in the same contents as those described in "(1) Cathode active material layer" above.

(3) Electrolyte Layer

The electrolyte layer is a layer formed between the cathode active material layer and the anode active material layer. The electrolyte that configures the electrolyte layer may be an electrolyte solution (liquid electrolyte) and may be a solid electrolyte. The liquid electrolyte contains, for example, a Li salt and a non-aqueous solvent. Examples of the Li salt may include $LiPF_6$, $LiBF_4$, $LiN(CF_3SO_2)_2$, and $LiN(C_2F_5SO_2)_2$. Examples of the non-aqueous solvent may include a cyclic carbonate such as ethylene carbonate (EC) and propylene carbonate (PC), and a chain carbonate such as dimethyl carbonate (DMC), diethyl carbonate (DEC), and ethyl methyl carbonate (EMC). Examples of the solid electrolyte may include an organic solid electrolyte such as a polymer electrolyte and a gel electrolyte, and an inorganic solid electrolyte such as a sulfide solid electrolyte, an oxide solid electrolyte, a nitride solid electrolyte, and a halide solid electrolyte.

(4) Other Constitutions

The battery cell in the present disclosure usually includes a cathode current collector for collecting currents of the cathode active material layer and an anode current collector for collecting currents of the anode active material layer. Also, the battery cell in the present disclosure includes a battery case. General materials may be used for these members.

3. Battery Module

The number of the battery cell in the battery module is not particularly limited, and may be appropriately arranged in accordance with the application of the battery module. Examples of the application of the battery module may include a power source for vehicles such as hybrid electric vehicles, battery electric vehicles, fuel cell electric vehicles and diesel powered automobiles. In some embodiments, the battery module is used as a power source for driving hybrid electric vehicles and battery electric vehicles. Also, the battery module in the present disclosure may be used as a power source for moving bodies other than vehicles (such as rail road transportation, vessel and airplane), and may be used as a power source for electronic products such as information processing equipment.

Incidentally, the present disclosure is not limited to the embodiments. The embodiments are exemplification, and any other variations are intended to be included in the technical scope of the present disclosure if they have substantially the same constitution as the technical idea described in the claims of the present disclosure and have similar operation and effect thereto.

EXAMPLES

Example 1

<Preparation of Elastic Member with Resin Composition Body Arranged>

As shown in FIG. 2B, the elastic member 2 including the concave and convex pattern 23 on its surface and also including the groove 21, and the resin composition body 3 arranged in the groove 21 were prepared. In a plan view along with the thickness direction, the resin composition body 3 was arranged to include a center of the battery cell. Also, the rate of the thickness $T_2$ of the resin composition body 3 with respect to the thickness $T_1$ of the elastic member 2, $T_2/T_1$ was ½ (=50%). Also, as shown in FIG. 6, the rate of the length $X_2$ of the resin composition body 3 with respect to the length $X_1$ of the elastic member 2, $X_2/X_1$, in the first direction was ¼ (=25%), and the rate of the length $Y_2$ of the resin composition body 3 with respect to the length $Y_1$ of the elastic member 2, $Y_2/Y_1$, in the second direction was ¼ (=25%).

Rubber was used as a material of the elastic member. Meanwhile, the resin composition body was produced in the following manner: Polypropylene as a resin, and a thermally expandable graphite as a thermally expandable layered inorganic substance were mixed in the weight ratio of 100:20, and the mixture was heated at a low temperature and molded. The temperature at which the resin composition body started to expand was 160° C., the volume expansion rate when expanded was 300%, and the heat conductivity after the expansion was 0.5 W/m·K.

<Production of Battery Module>

A battery cell was produced by using $LiNi_{1/3}Co_{1/3}Mn_{1/3}O_2$ as a cathode active material, graphite as an anode active material, and solution in which $LiPF_6$ was dissolved to be concentration of 1 mol/L, in a solvent made by mixing the equal volume of ethylene carbonate (EC) and diethyl carbonate (DEC), as a liquid electrolyte.

Five of the battery cells produced as above were prepared, and the elastic member with the resin composition body arranged therein was arranged between the battery cells neighboring, and thereby a battery module shown in FIG. 1 was produced.

Examples 2 to 3

Battery modules were respectively produced in the same manner as in Example 1, except that the sizes of the resin composition bodies ($T_2/T_1$, $X_2/X_1$ and $Y_2/Y_1$) were changed to the values shown in Table 1.

Comparative Example 1

A battery module was produced in the same manner as in Example 1 except that the groove was not arranged in the elastic member and the resin composition body was not arranged.

[Evaluation]
<Nail Penetration Test>

To the battery modules obtained in Examples 1 to 3 and Comparative Example 1, nail penetration tests were conducted in the below conditions, and the central cell (battery cell $1c$ in FIG. 1) was respectively intentionally brought into short circuit to emit smoke. After that, regarding the cells neighboring the central cell (battery cells $1b$ and $1d$ in FIG. 1), presence or absence of chain smoke emission and presence or absence of cell deformation were evaluated. The results are shown in Table 1.

—Conditions for the Nail Penetration Test—
SOC (state of charge): 100%
Nail: ϕ 6 mm, point angle 60°
Nail speed: 2 mm/sec
Nail penetration position: gas exhaust valve

TABLE 1

|  | Resin composition body | | | Cell neighboring | |
| --- | --- | --- | --- | --- | --- |
|  | $T_2/T_1$ | $X_2/X_1$ | $Y_2/Y_1$ | Chain | Deformation |
| Comparative Example 1 | — | — | — | Present | — |
| Example 1 | 1/2 | 1/4 | 1/4 | Absent | Present |
| Example 2 | 1/2 | 1/3 | 1/3 | Absent | Absent |
| Example 3 | 1 | 1/3 | 1/3 | Absent | Present |

As shown in Table 1, in Examples 1 to 3, chain smoke emission to the cells neighboring was not confirmed, and the heat conductivity from the central battery cell was inhibited. On the other hand, in Comparative Example 1, chain smoke emission to the cells neighboring was confirmed. In this manner, it was confirmed that the heat conductivity among the battery cells in rising temperature was restrained by using the elastic member including the specified resin composition body.

Also, in Examples 1 and 3, the deformation occurred in the cells neighboring, but in Example 2, the deformation did not occur in the cells neighboring. It was presumed that, in Example 1, the sizes of the resin composition body ($X_2/X_1$ and $Y_2/Y_1$) were small, and thus the stress of expansion concentrated at a partial region of the cells neighboring, and in Example 3, the resin composition body was arranged to penetrate the elastic member, and thus the stress concentrated at a partial region of the cells neighboring; as these results, the deformation of the cells neighboring occurred. On the other hand, it was presumed that, in Example 2, the sizes of the resin composition body ($T_2/T_1$, $X_2/X_1$ and $Y_2/Y_1$) were appropriate, and thus the deformation of the cells neighboring did not occur.

REFERENCE SIGNS LIST 1 battery cell
2 elastic member
3 resin composition body
10 battery module
11 cathode active material layer
12 anode active material layer
13 electrolyte layer
14 cathode current collector
15 anode current collector

What is claimed is:

1. A battery module comprising:
a plurality of battery cells arranged along a thickness direction;
an elastic member between neighboring battery cells of the plurality of battery cells; and
a thermally expandable resin composition body arranged in a groove or a penetrated part of the elastic member; wherein:
in a plan view along the thickness direction, the resin composition body is arranged to include a center of the neighboring battery cells;
a temperature at which the resin composition body starts to expand is 80° C. or more;
heat conductivity after expansion of the resin composition body is 0.5 W/m·K or less; and
in the plan view along the thickness direction, the elastic member is in a rectangular shape, and when a direction parallel to a longer side of the elastic member is regarded as a first direction, a direction orthogonal to the first direction is regarded as a second direction, $X_1$ designates a length of the elastic member in the first direction, $X_2$ designates a length of the resin composition body in the first direction, $Y_1$ designates a length of the elastic member in the second direction, and $Y_2$ designates a length of the resin composition body in the second direction, each of a ratio of the $X_2$ with respect to the $X_1$, which is $X_2/X_1$, and a ratio of the $Y_2$ with respect to the $Y_1$, which is $Y_2/Y_1$, is 25% or more and 50% or less.

2. The battery module according to claim 1, wherein, when $T_1$ designates a thickness of the elastic member and $T_2$ designates a thickness of the resin composition body, a ratio of the $T_2$ with respect to the $T_1$, which is $T_2/T_1$, is 35% or more.

3. The battery module according to claim 1, wherein each of the $X_2/X_1$ and the $Y_2/Y_1$ is 30% or more and 50% or less.

4. The battery module according to claim 1, wherein, in the plan view along with the thickness direction, when $S_1$ designates an area of a region specified from an outer edge of the elastic member, and $S_2$ designates an area of a region specified from an outer edge of the resin composition body, a ratio of the $S_2$ with respect to the $S_1$, which is $S_2/S_1$, is 6.25% or more and 25% or less.

5. The battery module according to claim 1, wherein the elastic member includes a concave and convex pattern on a surface.

6. The battery module according to claim 5, wherein the concave and convex pattern is in a comb tooth pattern, a stripe pattern or a dot pattern.

* * * * *